US009406271B2

(12) United States Patent
Yoon et al.

(10) Patent No.: US 9,406,271 B2
(45) Date of Patent: Aug. 2, 2016

(54) LIQUID CRYSTAL DISPLAY DEVICE WITH GATE-IN-PANEL STRUCTURE

(75) Inventors: Jae Ho Yoon, Gyeongbuk (KR); Dae Young Seok, Daegu (KR); Mon Soo Kang, Daegu (KR); Ki Taeg Shin, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 1330 days.

(21) Appl. No.: 12/960,603

(22) Filed: Dec. 6, 2010

(65) Prior Publication Data

US 2011/0134104 A1 Jun. 9, 2011

(30) Foreign Application Priority Data

Dec. 8, 2009 (KR) .................. 10-2009-0121255

(51) Int. Cl.
G09G 3/36 (2006.01)
G02F 1/1345 (2006.01)

(52) U.S. Cl.
CPC .......... *G09G 3/3677* (2013.01); *G02F 1/13452* (2013.01); *G09G 2330/06* (2013.01)

(58) Field of Classification Search
CPC ................................................ G02F 1/13452
USPC ....................................................... 349/152
See application file for complete search history.

(56) References Cited

U.S. PATENT DOCUMENTS

| 6,157,357 | A | * | 12/2000 | Kim | .................................. 345/87 |
|---|---|---|---|---|---|
| 6,924,794 | B2 | * | 8/2005 | Moon | ............................ 345/204 |
| 2004/0218108 | A1 | | 11/2004 | Ko et al. | |
| 2005/0030465 | A1 | * | 2/2005 | Park et al. | ...................... 349/149 |
| 2006/0061562 | A1 | * | 3/2006 | Park et al. | ...................... 345/204 |
| 2006/0203172 | A1 | * | 9/2006 | Baek et al. | ...................... 349/146 |
| 2008/0002130 | A1 | * | 1/2008 | Kil | .................................. 349/149 |
| 2008/0024407 | A1 | * | 1/2008 | Yamaguchi | ...................... 345/87 |
| 2008/0273002 | A1 | * | 11/2008 | Kim et al. | ....................... 345/98 |
| 2009/0115690 | A1 | * | 5/2009 | Chang et al. | ..................... 345/55 |

FOREIGN PATENT DOCUMENTS

| CN | 1580918 | 2/2005 |
|---|---|---|
| KR | 10-2008-0097309 A | 11/2008 |
| KR | 10-2009-0043749 A | 5/2009 |

OTHER PUBLICATIONS

CN Office Action dated Dec. 4, 2012 for corresponding KR application No. 201010585296.X.
KR Office Action dated May 27, 2013 for corresponding KR application No. 10-2009-0121255.

* cited by examiner

*Primary Examiner* — Nathanael R Briggs
*Assistant Examiner* — Alexander Gross
(74) *Attorney, Agent, or Firm* — Morgan, Lewis & Bockius LLP

(57) ABSTRACT

An LCD device with a GIP structure is disclosed. The LCD device includes: a liquid crystal display panel with an active area used to display images; a gate driving circuit formed on a side edge of the liquid crystal display panel and configured to apply scan signals to the active area; a start pulse line configured to transfer a start pulse to the gate driving circuit; and a static electricity preventer disposed on the start pulse line adjacent to the gate driving circuit and configured to prevent static electricity from being induced in the start pulse line.

17 Claims, 3 Drawing Sheets

LIQUID CRYSTAL DISPLAY DEVICE WITH GATE-IN-PANEL STRUCTURE

CROSS-REFERENCE TO RELATED APPLICATION

This application claims priority under 35 U.S.C. 119 to Korean Patent Application No. 10-2009-0121255, filed on Dec. 8, 2009, which is hereby incorporated by reference in its entirety.

BACKGROUND

1. Field of the Disclosure

This disclosure relates to a liquid crystal display (LCD) device and a manufacturing method thereof, and more particularly to an LCD device with a gate-in-panel structure and a manufacturing method thereof.

2. Description of the Related Art

As the community remarkably changes into an information society, flat display devices with superior features, such as light weight, small size, and low power drive, have been highlighted more and more. Among these flat display devices, the LCD devices have been actively applied to monitors of notebook and desktop computers, because of their superior definition, color scheme, and picture quality.

The LCD device generally includes two substrates configured to each include an electrode and disposed to allow the two electrodes to be opposite each other, and a liquid crystal material interposed between the two electrodes. Such an LCD device induces an electric field between the two electrodes using a voltage and forces liquid crystal molecules into the liquid crystal material to be realigned, thereby controlling light transmittance. As a result, the LCD device displays a variety of images.

Such an LCD device includes an LCD panel with a liquid crystal layer interposed between two substrates, a backlight unit disposed under the LCD panel, and a driver disposed by a side of the LCD panel and configured to drive the LCD panel. The backlight unit is used as a light source for emitting light to the LCD panel.

The driver is ordinarily embodied on a driving printed-circuit-board (PCB). The driving PCB can be divided into a gate driving PCB connected to gate lines on the LCD panel, and a data driving PCB connected to data lines of the LCD panel. Such gate and data driving PCBs are configured in the manner of a tape carrier package (TCP). Also, the gate and data driving PCBs are mounted on a gate pad portion, which is formed in an edge of the LCD panel and connected to the gate lines, and a data pad portion which is formed in another edge of the LCD panel perpendicular to the edge with the gate pad portion and connected to the data lines.

However, the driving PCB, which is divided into the gate and data driving PCBs and loaded on the gate and data pad portions, makes the size and weight of the LCD device to increase. To address this matter, the LCD device with a gate-in-panel (GIP) structure has been proposed which it allows not only one driving PCB to be loaded on one edge of the LCD panel but also the gate driving circuit to be directly formed on the LCD panel.

FIG. 1 is a circuitry diagram schematically showing an array substrate included in an LCD device with a GIP structure according to the related art. As shown in FIG. 1, the array substrate of the LCD device with the GIP structure is divided into an active area AA used to display images and non-active configured to surround the active area AA.

The active area AA includes gate and data lines GL and DL configured to cross each other and to define pixel regions P, thin film transistors TR each connected to the respective gate and data lines GL and DL, and pixel electrodes PXL connected to the respective thin film transistors TR. The thin film transistors TR are used as a switching element.

On the other hand, a part of the non-active area adjacent to a top edge of the active area AA includes a plurality of circuit film (not shown) divisionally loaded with a data driver (not shown). Another part of the non-active area adjacent to one of both side edges of the active area AA includes a gate driving circuit GCA and a signal input portion SIA positioned adjacent to an edge of the gate driving circuit GCA.

The gate driving circuit GCA is configured with a plurality of circuit blocks CB1 and CB2 each including a plurality of switching elements, capacitors, and so on. Each of the circuit blocks CB1 and CB2 is connected to the gate lines formed on the active area AA and first, second, and fourth signal lines CL1, CL2, and CL4 formed within the signal input portion SIA. Also, the circuit blocks CB1 and CB2 are serially connected to a third signal line CL3 within the signal input portion SIA.

The first signal line CL1 is used for transferring a high level driving voltage VDD. The second signal line CL2 is used to transferring a low level driving voltage VSS. The third signal line CL3 is used for transferring an enable signal EN. The fourth signal line CL4 is used for transferring a clock signal CLK.

During a process of manufacturing the signal lines CL1~CL4, gate lines GL, data lines DL, thin film transistors, or others, static electricity can be induced. The static electricity can cause a malfunction of the LCD panel. Due to this, the signal lines can be broken, and furthermore the circuit elements within the active area AA of the LCD device can be damaged.

Particularly, due to static electricity, an error is caused in the start pulse, which is used to start the operation of the gate driving circuit GCA, on the start pulse line Vst connected to only the first circuit block CB1 among the plurality of circuit blocks CB1 and CB2. In this case, the residual circuit blocks CB2 connected to the first circuit block CB1 malfunction, and furthermore the circuit elements within the active area AA can be damaged.

BRIEF SUMMARY

Accordingly, the present embodiments are directed to an LCD device with a GIP structure that substantially obviates one or more of problems due to the limitations and disadvantages of the related art, and a manufacturing method thereof.

An object of the present embodiments is to provide an LCD device with a GIP structure that is adapted to protect an LCD panel from static electricity, and a manufacturing method thereof.

Another object of the present disclosure is to provide an LCD device with a GIP structure that is adapted to prevent the generation of static electricity on a start pulse line connected to a gate driving circuit within an LCD panel, and a manufacturing method thereof.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, an LCD device of a GIP structure includes: a liquid crystal display panel with an active area used to display images; a gate driving circuit formed on a side edge of the liquid crystal display panel and configured to apply scan signals to the active area; a start pulse line configured to transfer a start pulse to the gate driving circuit; and a static electricity preventer disposed on the start pulse line adjacent to the gate driving circuit and configured to prevent static electricity from being induced in the start pulse line.

The static electricity preventer includes a static electricity prevention capacitor configured to include lower and upper electrodes opposite to each other in the center of a dielectric film.

The lower electrode is formed in a rectangular shape expanded from the start pulse line which is formed the same material as a gate line within the active area. The upper electrode is formed from the same material as a pixel electrode with the active area and configured to overlap with the lower electrode. The dielectric film includes a first dielectric film formed in the same material as a gate insulation film within the active area, and a second dielectric film formed in the same material as a passivation film within the active area.

The upper electrode is connected to a voltage line which is used to transfer a low level driving voltage to the gate driving circuit. The upper electrode can connected to the voltage line by means of a first jumper branched from a second jumper which is used to connect the voltage line with the gate driving circuit. The first jumper is connected to the upper electrode through a first contact hole which is formed in a passivation film, and to the voltage line through a second contact hole which is formed in a gate insulation film.

A manufacturing method of a liquid crystal display device of a gate-in-panel structure according to another aspect of the present embodiment comprising: forming a start pulse line, a lower electrode, and a voltage line on a substrate; forming a first dielectric film, which includes a first contact hole, on the substrate loaded with the start pulse line, lower electrode, and voltage line; forming a first jumper on the substrate provided with the first contact hole and a second jumper connected to the first jumper; forming a second dielectric film, which includes a second contact hole, on the substrate loaded with the first and second jumpers; and forming an upper electrode on the substrate provided with the second contact hole.

The lower electrode is formed from the same material as a gate line within an active area, and the upper electrode is from the same material a pixel electrode within the active area.

The first dielectric film is formed from the same material as a gate insulation film within an active area, and the second dielectric film is from the same material a passivation film within the active area.

The first jumper is connected to the voltage line through the first contact hole, and the second jumper is connected to the upper electrode through the second contact hole.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
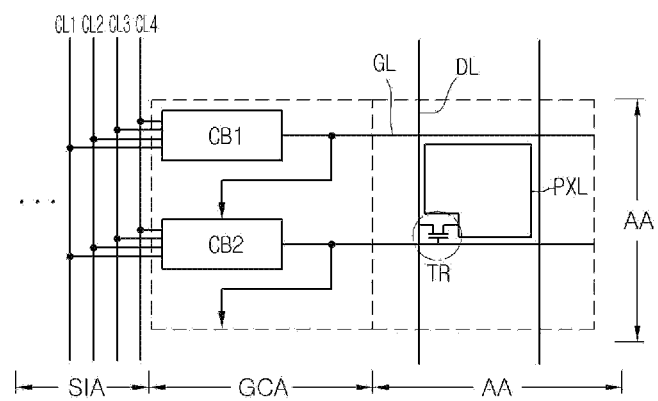
FIG. 1 is a circuitry diagram schematically showing an array substrate included in an LCD device with a GIP structure according to related art.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Furthermore, it will be understood that when an element, such as a substrate, a layer, a region, a film, or an electrode, is referred to as being formed "on" or "under" another element in the embodiments, it may be directly on or under the other element, or intervening elements (indirectly) may be present. The term "on" or "under" of an element will be determined based on the drawings. In the drawings, the sides of elements can be exaggerated for clarity, but they do not mean the practical sizes of elements.

Figure 2:
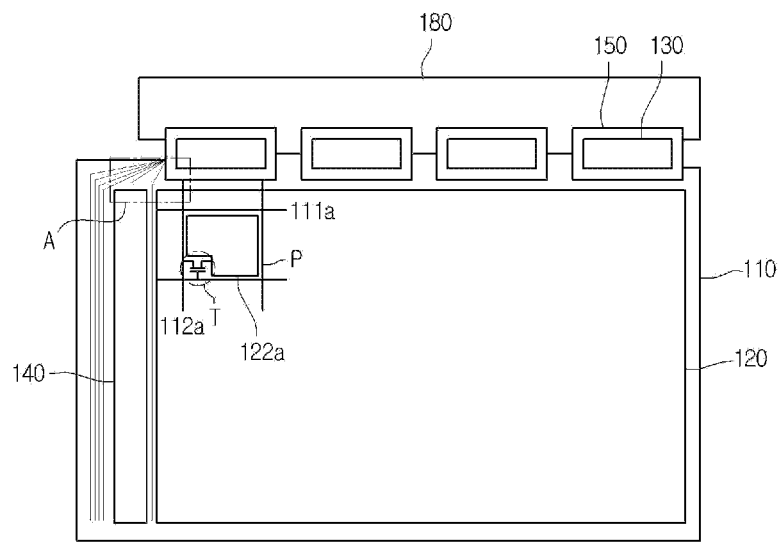
FIG. 2 is a block diagram schematically showing an LCD device with a GIP structure according to an embodiment of the present disclosure.
Figure 3:
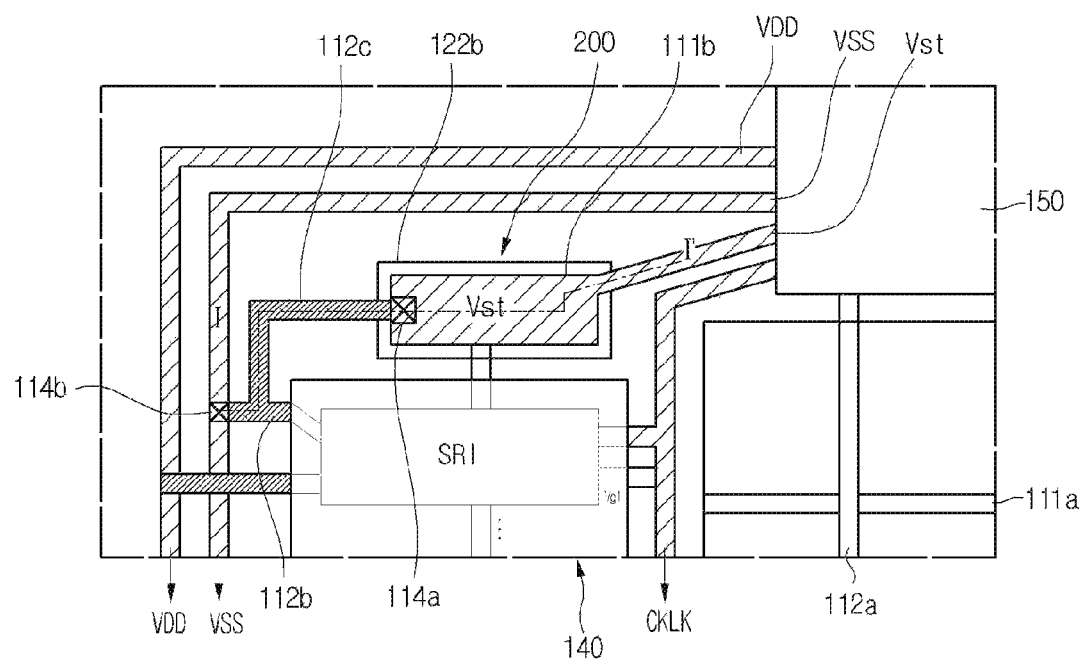
FIG. 3 is a planar view largely showing a portion "A" in FIG. 2.
Figure 4:
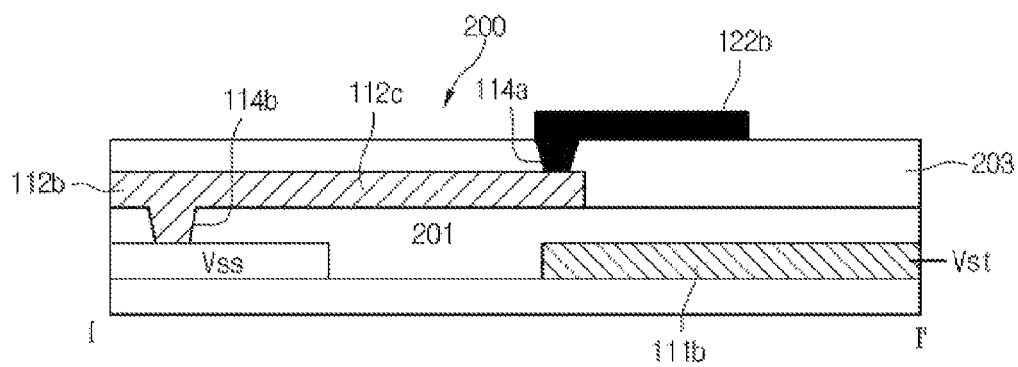
FIG. 4 is a cross-sectional view showing the array substrate taken along a line I-I' in FIG. 3.

FIG. 2 is a block diagram schematically showing an LCD device with a GIP structure according to an embodiment of the present disclosure. FIG. 3 is a planar view largely showing a portion "A" in FIG. 2. FIG. 4 is a cross-sectional view showing the array substrate taken along a line I-I' in FIG. 3.

First referring to FIG. 2, the LCD device with the GIP structure includes an LCD panel with a TFT array substrate 110 configured to have an active area 120. The active area 120 includes a plurality of gate lines 111a and a plurality of data lines 112a crossing each other. Such an LCD device is used to display images. The LCD device further includes a plurality of circuit films 150 each loaded with a data driver chip 130 which is configured to drive the plurality of data lines 112a, and a gate driving circuit 140 configured to drive the plurality of gate lines 111a. The gate driving circuit 140 can be divisionally formed on both edges of the TFT array substrate 110 adjacent to both side edges of the active area 120.

The TFT array substrate 110 includes thin film transistors T and pixel electrodes 122a which are formed in pixel regions P defined by the plurality of gate lines 111a and the plurality of data lines 112a crossing each other. The pixel electrodes 122a are used to drive liquid crystal molecules.

Although it is not shown in the drawings, the thin film transistor T is configured to include a gate electrode on the substrate 110, a gate insulation film formed to cover the gate electrode, and source and drain electrodes formed over the gate insulation film corresponding to both side of the gate electrode and disposed opposite each other. The source and drain electrodes is used to define a channel domain. The thin film transistor T further includes a semiconductor layer formed between the gate insulation film and the source and drain electrodes and used to form the channel, and a passivation (or protective) film formed on the entire surface of the substrate 110 with the source and drain electrodes. The passivation film is formed to include a contact hole exposing the drain electrode. As such, the above pixel electrode 122a formed on the passivation film is electrically connected to the exposed drain electrode through the contact hole. Such a thin film transistor T responds to a scan pulse from the respective gate line 111a and transfers a data signal from the respective data line 112a to the respective pixel electrode 122a.

The data driver chips 130 each loaded on the plurality of circuit films 150 are connected between the TFT array substrate 110 of the LCD panel and a PCB 180. The data driver chips 130 converts one line of digital image data from the exterior into one line of analog image data signals and applies one line of the converted analog image data signals to the data lines 112a, every horizontal synchronous interval that the scan pulse is applied to any one of the gate lines 111a. In other words, each of the data driver chips 130 selects any one from a set of gamma voltages according to the gray scale level of the digital image data, and applies the selected gamma voltage to the respective data line 112a as a data signal.

The TFT array substrate 110 further includes signal lines formed on its edge opposite to the active area 120 in the center of the gate driving circuit 140. The signal lines are used transfer a variety of control signals applied from a timing controller (not shown) within the PCB 180 through any one of the circuit films 150 to the gate driving circuit 140.

FIG. 3 illustrates in detail the gate driving circuit 140 and the signal lines used to transfer the control signals to the gate driving circuit 140. As shown in FIG. 3, the gate driving circuit 140 is formed on an inner edge of the TFT array substrate 110 adjacent to one side edge of the active area 120, and the signal lines connected to the timing controller (not shown) through one of the circuit films 150 are formed on an outer edge of the TFT array substrate 110 opposite to the active area 120 in the center of the gate driving circuit 140. The signal lines includes a first voltage line VDD used to transfer a high level driving voltage to the gate driving circuit 140, a second voltage line VSS used to transfer a low level driving voltage, a clock signal line CLK used to a clock signal to the gate driving circuit 140, and a start pulse line Vst used to transfer a start pulse to the gate driving circuit 140.

The gate driving circuit 140 includes a stage array with n stages SR1~SRn which sequentially output n scan signals Vg1~Vgn. Each of the stages SR1~SRn is configured to include a shift register cell.

Figure 5:
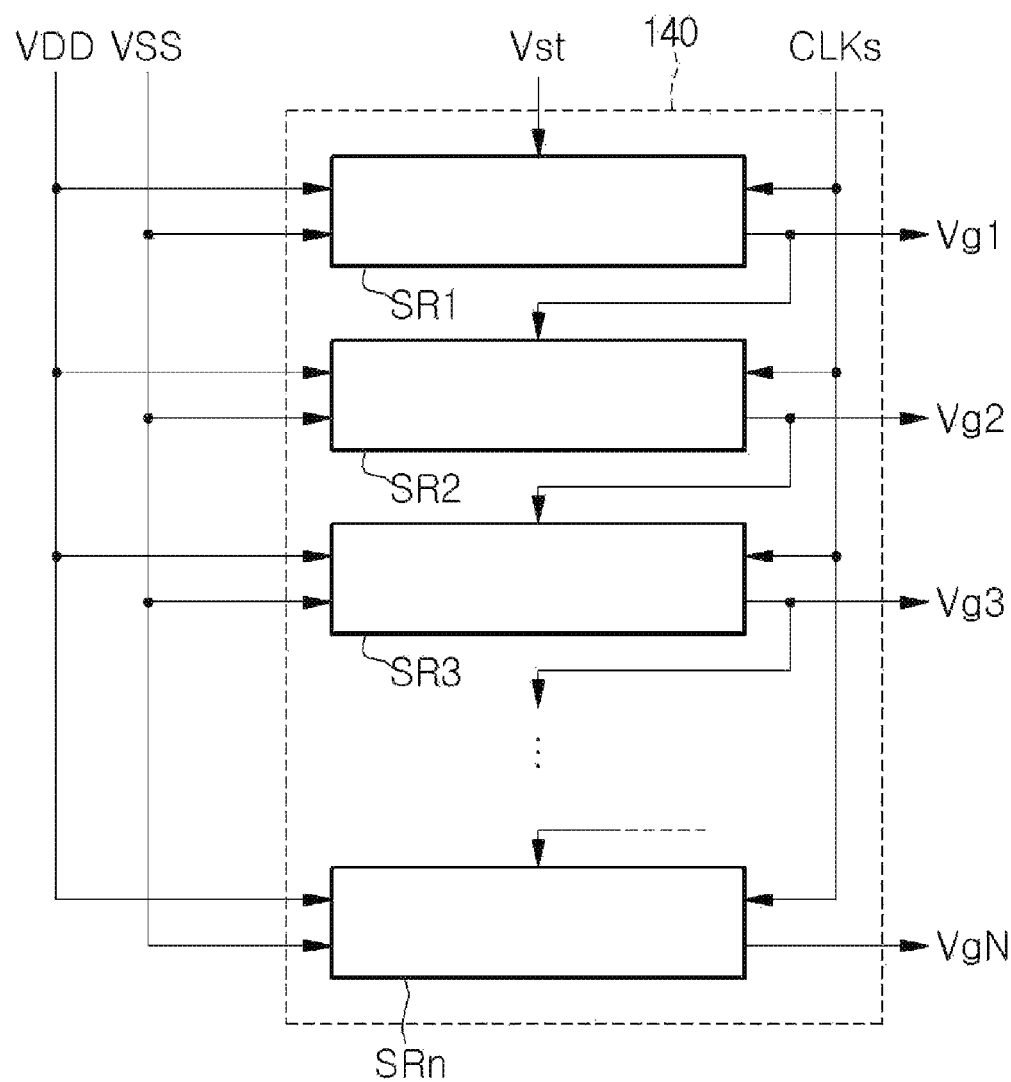
FIG. 5 is a block diagram showing the gate driving circuit shown in FIGS. 2 and 3.

More specifically, a first through nth stages SR1~SRn included in the gate driving circuit 140 commonly receive the high level driving voltage VDD, the low level driving voltage VSS, and the clock signal CLK, as shown in FIG. 5. Also, the first through nth stages SR1~SRn is serially connected to the start pulse line Vst. As such, each of the first through nth stages SR1~SRn responds to the start pulse Vst on the start pulse line Vst or an output signal (i.e., the scan signal) from a previous stage, and generates the scan signal using the driving voltages VDD and VSS and clock signal CLK. The scan signal generated in each of the first through nth stages SR1~SRn is applied to the respective gate line 111a and is provided a start pulse for the next stage SR. Therefore, the first through nth stages ST1~STn can sequentially output the scan signals Vg1~Vgn.

When a process of manufacturing the signal lines, gate lines, data lines, and thin film transistors included in the LCD device of the GIP is performed, static electricity can be induced on the start pulse line Vst which is used to transfer the start pulse for starting the operation of the first stage SR1. Due to this, the lines can be broken and/or circuit element within the active area 120 can be damaged. In order to prevent this problem, the LCD device of the present disclosure further includes a static electricity preventer 200 connected to the start pulse line Vst.

Referring to FIGS. 3 and 4, the static electricity preventer 200 includes a lower electrode 111b and an upper electrode 122b overlapped with each other in the center of first and second dielectric films 201 and 203. In other words, the static electricity preventer 200 includes a capacitor configured to prevent static electricity. Such a static electricity preventer 200 is disposed to overlap with at least a part of the start pulse line Vst adjacent to the first stage SR1 of the gate driving circuit 140.

The lower electrode 111b is formed by expanding a part of the start pulse line Vst in a width direction. In other words, the lower electrode 111b is formed in a rectangular shape connected to the start pulse line Vst. Also, the lower electrode 111b and the start pulse line Vst are formed in the same layer as the gate line 111a within the active area 120. Moreover, the lower electrode 111b is formed from the same material as the gate line 111a.

The upper electrode 122b is formed to overlap with the lower electrode 111b. Also, the upper electrode 122b is formed from the same material as the pixel electrode 122a within the active area 120. Furthermore, the upper electrode 122b is disposed in the same layer as the pixel electrode 122a.

The first and second dielectric films 201 and 203 between the lower and upper electrodes 111b and 122b are formed from the same materials as the gate insulation film 201 and the passivation film 203 within the active area 120, respectively. Also, the first and second dielectric films 201 and 203 are disposed in the same layers as the gate insulation film 201 and the passivation film 203, respectively.

The upper electrode 122b is connected to the second voltage line VSS. As such, the upper electrode 122b can allow static electricity to discharged through the second voltage line VSS, thereby preventing the induction of static electricity on the start pulse line Vst.

The upper electrode 122b is connected to the second voltage line VSS by means of a second jumper 112c branched from a first jumper 112b which is used to connect the second voltage line VSS with the first stage SR1. The second jumper 112c is connected to the upper electrode 122b via a first contact hole 114a formed in the passivation film 203. Also, the second jumper 112c is connected to the second voltage line VSS via a second contact hole 114b formed in the gate insulation film 201.

In this manner, the LCD device of the GIP structure according to an embodiment of the present disclosure is provided with the static electricity preventer 200 which is connected between the second voltage line VSS for transferring the low level driving voltage and the start pulse line Vst for transferring the start pulse. As such, the LCD device can prevent the induction of static electricity on the start pulse line Vst. Therefore, the LCD device can protect the LCD panel from static electricity.

Subsequently, a method of manufacturing such a static electricity preventer 200 included in the LCD device of the GIP structure will be explained.

As shown in FIG. 4, a start pulse line Vst, a lower electrode 111b, and a second voltage line VSS is formed by depositing a first metal film on a substrate 100 and patterning the first metal film. The start pulse line Vst, the lower electrode 111b, and the second voltage line VSS are formed from the same material and in the same layer as gate lines 111a within an active area 120.

Thereafter, a first dielectric film 201 is formed on the substrate 100 loaded with the start pulse line Vst, lower electrode 111b and second voltage line VSS. The first dielectric film 201 is formed from the same material and in the same layer as a gate insulation film 201 within the active area 120. Also, a second contact hole 114b is formed by patterning the first dielectric film 201. The second contact hole 114b exposes a part region of the second voltage line VSS.

Continuously, first and second jumpers 112b and 112c are formed by depositing a second metal film on the entire surface of the substrate 100, in which the second contact hole 114b is formed, and patterning the second metal film.

Afterward, a second dielectric film 203 is formed on the substrate 100 provided with the first and second jumpers 112b and 112c. The second dielectric film 203 is formed from the same material and in the same layer as a passivation film 203 within the active area 120. Also, a first contact hole 114a is formed in the second dielectric film 203 by patterning the second dielectric film 203. The first contact hole 114a exposes the second jumper 112c.

Finally, an upper electrode 122b is formed by depositing a third metal film on the entire surface of the substrate 100 provided with the first contact hole 114a and patterning the third metal film. The manufacturing method of the static electricity preventer 200 is completed with the formation of the upper electrode 122b. The upper electrode 122b is formed from the same material and in the same layer as a pixel electrode 122a within the active area 120.

Although a preferable embodiment has been described in detail with reference to a illustrative embodiment, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. Therefore, variations and modifications in the component parts and/or arrangements, alternative uses must be regarded as included in the appended claims.

What is claimed is:

1. A liquid crystal display device of a gate-in-panel structure comprising:
a liquid crystal display panel with an active area used to display images;
a gate driving circuit formed on a side edge of the liquid crystal display panel and configured to apply scan signals to the active area;
a start pulse line configured to transfer a start pulse to the gate driving circuit; and
a static electricity preventer disposed on the start pulse line adjacent to the gate driving circuit and configured to prevent static electricity from being induced in the start pulse line,
wherein the static electricity preventer includes a static electricity prevention capacitor configured to include lower and upper electrodes opposite to each other in the center of a dielectric film;
wherein the upper electrode is connected to a voltage line via another line in a layer different from that of the upper electrode, the voltage line is configured to transfer a low level driving voltage to the gate driving circuit, the upper electrode is formed from the same material as a pixel electrode within the active area, and the upper electrode is disposed in the same layer as the pixel electrode;
wherein the lower electrode is an expansion of the start pulse line in a width direction, a width of the lower electrode being greater than a width of the start pulse line in plan view; and
wherein the lower electrode and the upper electrode each have a rectangular shape, the rectangular shapes overlapping in plan view.

2. The liquid crystal display device claimed as in claim 1, wherein the lower electrode and the start pulse line are formed from the same material as a gate line within the active area, and wherein the upper electrode is configured to overlap with the lower electrode.

3. The liquid crystal display device claimed as in claim 1, wherein the dielectric film includes:
a first dielectric film formed in the same material as a gate insulation film within the active area; and
a second dielectric film formed in the same material as a passivation film within the active area.

4. The liquid crystal display device claimed as claim 1, wherein the another line includes a first jumper and a second jumper, the first jumper branched from the second jumper which is used to connect the voltage line with the gate driving circuit.

5. The liquid crystal display device claimed as claim 4, wherein the first jumper is connected to the upper electrode through a first contact hole which is formed in a passivation film, and to the voltage line through a second contact hole which is formed in a gate insulation film.

6. A method of manufacturing a liquid crystal display device of a gate-in-panel structure, the gate-in-panel structure including an active area used to display images, the method comprising:
forming a start pulse line, a lower electrode, and a voltage line on a substrate;
forming a first dielectric film, which includes a first contact hole, on the substrate loaded with the start pulse line, lower electrode, and voltage line;
forming a first jumper on the substrate provided with the first contact hole and a second jumper connected to the first jumper;
forming a second dielectric film, which includes a second contact hole, on the substrate loaded with the first and second jumpers; and
forming an upper electrode on the substrate provided with the second contact hole,
wherein the upper electrode is connected to the voltage line via another line in a layer different from that of the upper electrode, the another line includes the first jumper and the second jumper, the voltage line is configured to transfer a low level driving voltage to a gate driving circuit, the upper electrode is formed from the same material as a pixel electrode within the active area, and the upper electrode is disposed in the same layer as the pixel electrode;

wherein the lower electrode is an expansion of the start pulse line in a width direction, a width of the lower electrode being greater than a width of the start pulse line in plan view; and wherein the lower electrode and the upper electrode each have a rectangular shape, the rectangular shapes overlapping in plan view.

7. The method claimed as in claim 6, wherein the lower electrode is formed from the same material as a gate line within the active area.

8. The method claimed as in claim 6, wherein the first dielectric film is formed from the same material as a gate insulation film within the active area, and wherein the second dielectric film is formed from the same material as a passivation film within the active area.

9. The method claimed as in claim 6, wherein the first jumper is connected to the voltage line through the first contact hole, and wherein the second jumper is connected to the upper electrode through the second contact hole.

10. The liquid crystal display device claimed as in claim 1, wherein the lower electrode is an expansion of the start pulse line and is formed on a same layer as the start pulse line, the lower electrode being directly and electrically connected to the start pulse line.

11. The method claimed as in claim 6, wherein the lower electrode is an expansion of the start pulse line and is formed on a same layer as the start pulse line, the lower electrode being directly and electrically connected to the start pulse line.

12. The liquid crystal display device claimed as in claim 1, wherein the lower electrode is a terminal end of the start pulse line in the width direction.

13. The liquid crystal display device claimed as in claim 1, further comprising:

another voltage line configured to transfer a high level driving voltage to the gate driving circuit.

14. The method claimed as in claim 6, wherein the lower electrode is a terminal end of the start pulse line in the width direction.

15. The method claimed as in claim 6, further comprising:

forming another voltage line on the substrate, wherein the another voltage line is configured to transfer a high level driving voltage.

16. The liquid crystal display device claimed as in claim 1, wherein the rectangular shape of the upper electrode completely overlaps the rectangular shape of the lower electrode in plan view.

17. The method claimed as in claim 6, wherein the rectangular shape of the upper electrode completely overlaps the rectangular shape of the lower electrode in plan view.

* * * * *